Patented July 21, 1936

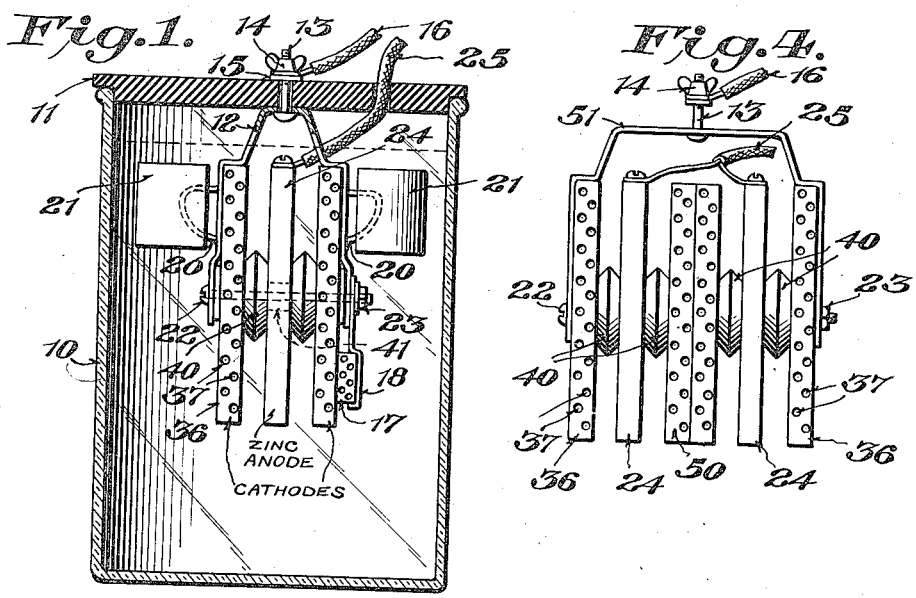
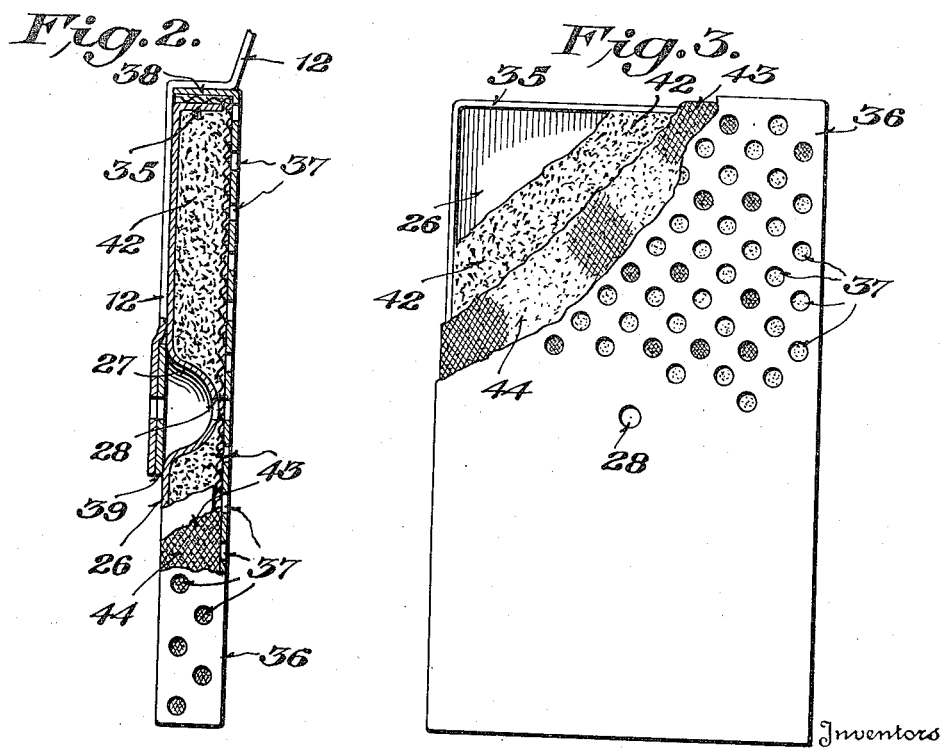

2,048,347

UNITED STATES PATENT OFFICE 2,048,347

PRIMARY CELL

Martin L. Martus, Woodbury, and Edmund H. Becker, Waterbury, Conn.

Application March 20, 1935, Serial No. 12,066

15 Claims. (Cl. 136—115)

This invention relates to primary cells; and it comprises in a primary cell employing an alkaline electrolyte and having a zinc electrode and a copper oxid depolarizer and positive and negative terminals, an improved separator member separating the depolarizer from the electrolyte, comprising a layer of fabric, advantageously pre-shrunk cotton cloth carrying in and on its surface a pervious, electrically continuous coating formed from copper or other suitable metal in electrical contact with the depolarizer and of the same polarity, that is, not tending to form a galvanic couple with the depolarizer; and it further comprises in a cell of the type described employing a depolarizer material improved carrying means for the depolarizer material comprising a container adapted to hold a body of depolarizer material and a perforated metal cover therefor and a separator of the type described between the cover and the body of depolarizer material and with its metallized surface in contact with the depolarizer material and in electrical connection with the positive terminal of the cell, whereby more uniform action of the cell is obtained and contamination of the electrolyte is minimized; all as more fully hereinafter set forth and as claimed.

Primary cells of the modern modified Lalande type find extensive use in signal, telegraph and telephone work where a dependable source of current is required that will give a steady current at a low rate of discharge over a long period of time. The cells generally operate under closed circuit conditions; conditions to which cells of this type are well suited.

Modern Lalande type wet cells comprise one or more zinc anodes and one or more depolarizing cathodes. The electrolyte is commonly a concentrated caustic soda solution. The depolarizing material of the cathode is usually copper oxid, or, less commonly, activated carbon. The cathode is made in various forms. Sometimes the copper oxid is formed into a solid block or stick and is more or less self-supporting; but more often the copper oxid is in granular form and is retained in a basket or canister of some kind, usually of metal and having plenty of perforations to allow access of the electrolyte to the material. The form, arrangement and number of the zinc and copper oxid electrodes determine the characteristics during discharge, and the rate at which current may be safely taken from it. Many modifications of the basket type cell have been proposed in attempts to get the most desirable combination of characteristics.

It has been found that a particularly desirable cathode construction is to dispose granular copper oxid (or carbon) in a shallow vertical tray, the sides and back of which are impervious, and to retain the copper oxid in place with a perforated cover. This construction presents a large area of copper oxid for reaction and hence makes for high capacity. If the tray is of metal, the electrical connection for the cathode can be made to it.

The present invention, while applicable to various kinds of Lalande type cells, is of special utility in connection with the type of construction just described. For brevity the invention will be described as applied to a cell utilizing copper oxid as the depolarizer.

We have now found that this cathode construction can be even further improved and an even better cell produced, by providing a new type of separator between the copper oxid body and the enclosing perforated cover of this or similar type of cell. There is substantial improvement in the cell when used in closed circuit work, and even greater improvement in the operation of the cell in open circuit work. The separator comprises a metallized layer of fabric. The fabric should be of a kind insoluble in the alkaline cell electrolyte. Cotton fulfills this requirement. The fabric should be thin and have a fairly open mesh. Pre-shrunk cheese cloth is excellent. Shrinking may be performed by a sort of mercerizing action, using a caustic soda solution, as described in Patent No. 1,644,344 to Martus and Becker.

The metal used in metallizing the fabric is advantageously copper. One convenient way to make such a separator is to spray cheese cloth with the molten metal, the conditions being adjusted so that the metal adheres to the cloth without injuring it. The cloth is provided with a cloth-like porous metal coating or layer in which the metal forms a continuum. All particles of the metal are in electrical union.

This metallized fabric separator is positioned between the perforated cover or basket and the copper oxid body. The metallized surface is put in contact with the copper oxid; the cloth surface being next the cover. In the cell, the copper oxid body is provided with a uniformly conducting surface and this makes for higher efficiency and smoother operation. The cloth of the separator acts as a sort of filtering medium and prevents contamination of the electrolyte.

In the accompanying drawing we have shown, more or less diagrammatically, examples of specific embodiments of apparatus within the invention. In the drawing, Fig. 1 is a view partly in elevation and partly in vertical section of a cell embodying the cathode construction of the present invention;

Fig. 2 is a side view of one of the cathodes of Fig. 1, with part of the cover broken away;

Fig. 3 is a front view corresponding to Fig. 2; and

Fig. 4 is a view similar to Fig. 1 of a modified electrode assembly having three cathodes and two anodes.

In the showings, in which like reference characters indicate like parts, Fig. 1 shows the invention embodied in a complete cell of the "add-water" type. The cell comprises a glass jar 10 provided with a cover 11 of insulating material to which is attached a suspension yoke 12 by means of a bolt 13, nut 14 and washer 15, as shown. The cathode electrical connection 16 is made to the nut, as shown. The yoke is provided with ears 20 carrying blocks 21 of caustic alkali, which go into solution when water is added to the cell. The lower ends of the yoke are provided with a cross bolt 22 with nut 23, on which are mounted the electrodes. The zinc electrode (anode) is in the form of a slab 24 provided with an electrical connection 25. Each of the two cathodes comprises an impervious metal tray-like backing member 26 indented as at 27 and perforated as at 28, to receive bolt 22. The tray has sides 35 and is provided with a cover 36 perforated all over its surface as indicated at 37 and having sides 38 extending over the sides 35 of the backer.

The cathodes and anode are mounted on the rod 22 as shown, washers 39 being provided between the yoke ends and backer 26, and insulating spacers 40 being provided between the cathodes and the zinc. An insulating bushing indicated at 41 insulates the zinc from bolt 22. A perforated container 17 containing a piece of absorbent material saturated with oil (not shown) is attached to the yoke bolt 22 by a hanger 18, as shown. When the cell is put into operation by pouring in water, the oil floats to the surface of the electrolyte and seals it from the air. This sealing means is described in Patent No. 1,532,252 to Martus and Becker.

The backing member 26 and cover 36 define a chamber in which is placed a body of granular depolarizing material 42; copper oxid in this case.

According to the invention a separator member 43 is provided between the copper oxid body and the cover 36 of the cathode. The separator member advantageously comprises cheese cloth (cotton cloth). The cloth is provided with a continuum of embedded granules or particles of metal indicated at 44. The metal may be iron or copper, neither tending to set up any appreciable electric potential against copper oxide, being of like polarity therewith. If only one side of the cloth is metallized, that side is placed in contact with the copper oxid body, the un-metallized side being adjacent the cover. In some cases it is advantageous to metallize both sides of the fabric. Sometimes one side of the fabric can be metallized with one metal and the other side with another.

The fabric is conveniently prepared by spraying the molten metal on to the fabric by means of a Schoop gun or the like under conditions such that the fabric is not scorched but the metal adheres tenaciously to the fibers. Enough metal is deposited to sprinkle all parts of the fabric and to provide an electrically-conductive continuum, but the spraying is stopped short of completely sealing the cloth. Plenty of orifices are left scattered over the surface. The separator remains quite pervious and porous throughout the life of the cell and does not hinder penetration of the electrolyte. The sprayed cloth has a kind of filtering action which tends to keep the electrolyte clean and uncontaminated. Finely divided particles of copper or copper oxid are prevented from getting into the electrolyte.

In assembling a cathode of the type described with the present separator, the shallow tray 26 is filled with copper oxid. The metallized cloth is placed in the perforated cover and the cover and cloth forced over the tray. The cloth extends between the sides of the cover and the sides of the tray, as shown, and makes electrical contact with the sides of the tray. The cover is held on in any convenient manner as by friction, welding or seaming.

Fig. 4 shows a modification of the electrode assembly of Fig. 1, useful in certain relations. This modification includes two zinc electrodes and three cathodes, the central cathode 50 being formed of two cathodes of the type shown in Fig. 1 fastened together in electrical union, back to back. A yoke 51 supports the elements in a manner similar to the arrangement in Fig. 1. The same advantages accrue in this modification.

While the invention has been described in relation to a particular type of cell, with which it has certain special advantages, it is readily adaptable to various other types of cell. Using the metallized cloth cover member for the copper oxid, the outer perforated basket, shell or casing can in some cases be dispensed with; the copper oxid being contained in a sack of the metallized cloth or in a container faced with the cloth alone.

What we claim is:—

1. In a primary cell having a zinc anode and a depolarizer and employing an alkaline electrolyte, means for separating the depolarizer from the electrolyte and preventing contamination of the electrolyte by disintegration of the depolarizer, comprising a pervious, electrically continuous, permanent layer of metal in and on a surface of a porous fabric layer, said metal layer being in electrical contact with the depolarizer and not forming a galvanic couple therewith.

2. In a primary cell having a zinc anode and a cathode comprising granular depolarizer material and employing an alkaline electrolyte, means for holding the depolarizer material in place and separating it from the electrolyte, comprising a pervious, electrically continuous layer of metal in and on a surface of a porous fabric layer, said metal layer being in electrical contact with the depolarizer and not forming a galvanic couple therewith.

3. In a primary cell having a zinc anode and a depolarizer and employing an alkaline electrolyte, means for separating the depolarizer from the electrolyte comprising a pervious, electrically continuous layer of metal in and on a surface of a porous fabric layer, said metal layer being in electrical contact with the depolarizer and not forming a galvanic couple therewith, said metal layer having the characteristics of sprayed metal.

4. In a primary cell having a zinc anode and a depolarizer and employing an alkaline electrolyte, means for separating the depolarizer from the electrolyte comprising a sheet of open mesh cotton cloth pre-shrunk in an alkaline solution and carrying a pervious, electrically continuous layer of metal in and on a surface of the porous fabric layer, said metal layer being in electrical contact with the depolarizer and not forming a galvanic couple therewith.

5. A separator in electric cells of the type having a zinc anode, an alkaline electrolyte and a depolarizer, said separator being a layer of porous fabric with a pervious layer of metal united to the fabric and extending as a conductive continuum over the surface thereof, the metal being one not forming a galvanic couple with the depolarizer.

6. A separator in electric cells of the type having a zinc anode, an alkaline electrolyte and a depolarizer, said separator being a layer of open mesh fabric with a pervious, sprayed on layer of metal united to the fabric and extending as a conductive continuum over one surface thereof, the metal being one not forming a galvanic couple with the depolarizer.

7. In a primary cell employing an alkaline electrolyte and having a zinc electrode and a depolarizer, improved means for separating the depolarizer from the electrolyte comprising a layer of cloth having filtering characteristics and carrying a pervious, electrically continuous layer of metal in and on a surface thereof, the separator being placed between the depolarizer and the electrolyte, with the metallized surface of the separator in electrical contact with the depolarizer.

8. In a primary cell employing an alkaline electrolyte and having a zinc electrode and a depolarizer, improved carrying means for the depolarizer comprising an electrically conductive container adapted to hold a body of the depolarizer material, and a separator between the depolarizer and the electrolyte, said separator being a layer of fabric having filtering characteristics and carrying in and on its surface a pervious, electrically conductive coating of metal in electrical contact with the depolarizer.

9. In a primary cell employing a caustic alkaline electrolyte and having a zinc electrode and a depolarizer, improved carrying means for the depolarizer material comprising an imperforate metal container adapted to hold a body of the material and a perforated cover therefor and a separator between the depolarizer material and the cover, the separator being a layer of fabric having filtering characteristics and carrying in and on its surface a pervious, electrically continuous layer of metal in electrical contact with the depolarizer.

10. In a primary cell employing an alkaline electrolyte and having a zinc electrode and a depolarizer, improved carrying means for the depolarizer material, comprising a shallow tray of impervious metal adapted to hold a body of depolarizer material and a perforated metal cover therefor and a separator between the depolarizer body and the cover member, comprising a layer of fabric carrying a pervious, electrically continuous layer of metal in and on its surface, said metal being in electrical contact with the depolarizer.

11. The matter of claim 1 wherein the separator is fabric provided with a layer of finely divided copper in quantity sufficient to provide an electrically continuous, pervious coating for the fabric.

12. The matter of claim 1 wherein the depolarizer material is copper oxid.

13. The matter of claim 4 wherein the fabric is fine cheese cloth, pre-shrunk in caustic soda.

14. The matter of claim 1 wherein the fabric is coated on both sides with a metal.

15. The matter of claim 7 wherein the fabric has a sprayed on coating of metal.

MARTIN L. MARTUS.
EDMUND H. BECKER.